United States Patent [19]

Springer et al.

[11] Patent Number: 5,290,923
[45] Date of Patent: Mar. 1, 1994

[54] MONOAZO REACTIVE DYE WHICH CONTAINS A DICYANOAMINOTRIAZINYL GROUP AND A GROUP OF THE VINYLSULFONE SERIES

[75] Inventors: Hartmut Springer, Königstein/Taunus; Rolf Gleissner, Frankfurt am Main, both of Fed. Rep. of Germany

[73] Assignee: Hoechst Aktiengesellschaft, Frankfurt am Main, Fed. Rep. of Germany

[21] Appl. No.: 969,811

[22] PCT Filed: Jul. 10, 1991

[86] PCT No.: PCT/EP91/01285
§ 371 Date: Jan. 21, 1993
§ 102(e) Date: Jan. 21, 1993

[87] PCT Pub. No.: WO92/01755
PCT Pub. Date: Feb. 6, 1992

[30] Foreign Application Priority Data

Jul. 24, 1990 [DE] Fed. Rep. of Germany ....... 4023475

[51] Int. Cl.$^5$ .................. C09B 62/51; D06P 1/384
[52] U.S. Cl. .......................................... 534/642; 8/549
[58] Field of Search ........................................ 534/642

[56] References Cited

U.S. PATENT DOCUMENTS

| | | | |
|---|---|---|---|
| 3,758,470 | 9/1973 | Ackermann et al. | 534/638 X |
| 4,448,583 | 5/1984 | Corso | 8/549 X |
| 4,649,193 | 3/1987 | Meininger et al. | 534/642 X |
| 4,707,545 | 11/1987 | Meininger et al. | 534/642 X |
| 4,725,675 | 2/1988 | Meininger et al. | 534/642 X |
| 4,769,446 | 9/1988 | Corso et al. | 534/642 |
| 5,225,544 | 7/1993 | Dannheim et al. | 534/642 |

FOREIGN PATENT DOCUMENTS

| | | |
|---|---|---|
| 0040806 | 12/1981 | European Pat. Off. |
| 0066819 | 12/1982 | European Pat. Off. |
| 0210492 | 2/1987 | European Pat. Off. |
| 2066070 | 8/1971 | France |

*Primary Examiner*—Mary C. Lee
*Assistant Examiner*—Fiona T. Powers

[57] ABSTRACT

Monoazo compounds which possess fiber-reactive groups and have useful dye properties and are capable of dyeing hydroxyl- and/or carboxamido-containing materials, in particular fiber materials, such as cellulose fibers and natural and synthetic polyamide, such as wool, in strong, fast shades. They conform to the formula

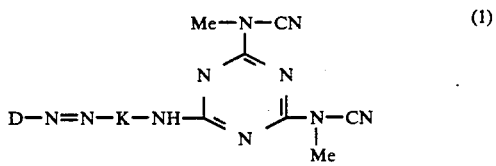

wherein D, K and Me are as defined in the specification.

10 Claims, No Drawings

MONOAZO REACTIVE DYE WHICH CONTAINS A DICYANOAMINOTRIAZINYL GROUP AND A GROUP OF THE VINYLSULFONE SERIES

The invention relates to the field of fiber-reactive dyes.

Fiber-reactive azo dyes having carboxamide groups as substituents on an aromatic radical are known for example from U.S. Pat. Nos. 4,448,583, 4,707,545 and 4,769,446 and European Patent Application Publication No. 0 210 492A. However, under alkaline dyeing conditions the amide bond may break, which leads to a marked shift in hue. By contrast, this effect is not shown by dyes having a chloro-s-triazinyl-containing amino group bonded to an aromatic radical, as known for example from U.S. Pat. No. 4,725,675 and European Patent Application Publication No. 0 066 819A. However, these dyes have the disadvantage that they are not dischargeable and therefore have only limited usefulness in ground dyeing.

The present invention provides water-soluble monoazo compounds which are improved in this respect and have the formula (1), indicated and defined hereinafter, and which have very good fiber-reactive, dyeing properties.

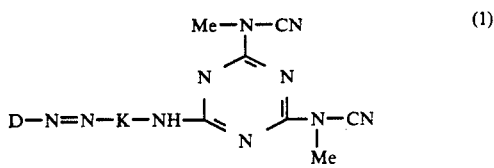

(1)

In the formula (1):
Me is hydrogen or an alkali metal, such as sodium, potassium or lithium;
K is a radical of the formula (2)

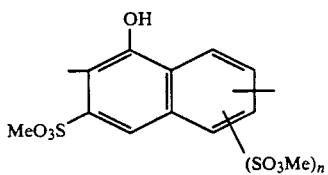

(2)

where
Me has one of the abovementioned meanings and
n is zero or 1, preferably 1, (if zero, this group being hydrogen);
D is a group of the formula (3a), (3b) or (3c)

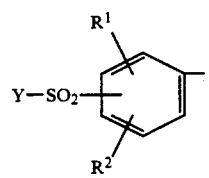

(3a)

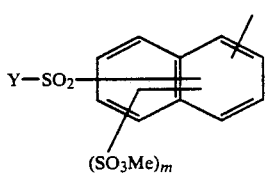

(3b)

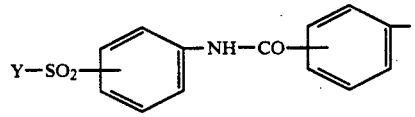

(3c)

where
Me has one of the abovementioned meanings,
$R^1$ is hydrogen, alkyl of from 1 to 4 carbon atoms, such as ethyl and in particular methyl, which may be sulfo-, carboxyl- or sulfato-substituted, alkoxy of from 1 to 4 carbon atoms, such as ethoxy and in particular methoxy, which may be sulfo-, carboxyl or sulfato-substituted, chlorine, bromine, hydroxyl, cyano, carboxyl or sulfo, preferably hydrogen, methyl, methoxy or ethoxy,
$R^2$ is hydrogen, alkyl of from 1 to 4 carbon atoms, such as ethyl and in particular methyl, or alkoxy of from 1 to 4 carbon atoms, such as ethoxy and in particular methoxy, preferably hydrogen or methoxy,
Y is vinyl or ethyl which contains in the β-position a substituent which is eliminable by alkali to form a vinyl group, and
m is zero, 1 or 2 (if zero, this group being hydrogen).

In the formula (3a) the group Y—SO₂— is preferably bonded to the benzene ring meta or para to the free bond leading to the azo group, and in the formula (3c) this group is preferably bonded to the benzene ring meta or para to the aminocarbonyl group. In the formula (3b) the free bond which leads to the azo group is preferably in the 2-position of the naphthalene radical.

The individual variables can be identical or different relative to one another within their meanings.

Substituents which are in the β-position of the ethyl group of the variable Y and which are alkali-enminable are for example alkanoyloxy groups of from 2 to 5 carbon atoms, such as acetyloxy groups, aroyloxy groups, such as benzoyloxy, sulfobenzoyloxy or carboxybenzoyloxy, alkyl and dialkyl-amino groups having alkyl moieties of from 1 to 4 carbon atoms, such as in particular dimethylamino and diethylamino, trialkylammonium groups having alkyl moieties of from 1 to 4 carbon atoms, such as trimethylammonium, the anion thereof being a customary colorless anion, such as chloride, hydrogensulfate or sulfate, alkylsulfonyloxy groups of from 1 to 4 carbon atoms, such as methylsulfonyloxy, fluorine or bromine and in particular a phosphato, thiosulfato or sulfato group. Preferably, the Y—SO₂— group is vinylsulfonyl or β-chloroethylsulfonyl, β-thiosulfatoethylsulfonyl or β-sulfatoethylsulfonyl, in particular β-sulfatoethylsulfonyl.

Sulfo, carboxyl, sulfato, thiosulfato and phosphato groups are groups of the formula —SO₃Me, —COOMe, —OSO₃Me, —S—SO₃Me or —OPO₃Me₂, in each of which Me has one of the abovementioned meanings.

The radical D is for example:
2-(β-sulfatoethylsulfonyl)phenyl,
3-(β-sulfatoethylsulfonyl)phenyl,
4-(β-sulfatoethylsulfonyl)phenyl,
2-carboxy-5-(β-sulfatoethylsulfonyl)phenyl,
2-chloro-3-(β-sulfatoethylsulfonyl)phenyl,
2-chloro-4-(β-sulfatoethylsulfonyl)phenyl,
2-ethoxy-4-(β-sulfatoethylsulfonyl)phenyl,
2-ethoxy-5-(β-sulfatoethylsulfonyl)phenyl,
2-ethyl-4-(β-sulfatoethylsulfonyl)phenyl,
2-methoxy-5-(β-sulfatoethylsulfonyl)phenyl, 2,4-dimethoxy-5-(β-sulfatoethylsulfonyl)phenyl,
2,4-dimethoxy-5-(β-sulfatoethylsulfonyl)phenyl,
2,5-dimethoxy-4-(β-sulfatoethylsulfonyl)phenyl,
2-methoxy-5-methyl-4-(β-sulfatoethylsulfonyl)phenyl,
2-(β-thiosulfatoethylsulfonyl)phenyl,
3-(β-thiosulfatoethylsulfonyl)phenyl,
4-(β-thiosulfatoethylsulfonyl)phenyl,
2-methoxy-5-(β-thiosulfatoethylsulfonyl)phenyl,
2-sulfo-4-(β-phosphatoethylsulfonyl)phenyl,
2-sulfo-4-(vinylsulfonyl)phenyl,
2-chloro-4-(β-chloroethylsulfonyl)phenyl,
2-chloro-5-(β-chloroethylsulfonyl)phenyl,
3-(β-acetyloxyethylsulfonyl)phenyl,
4-(β-acetyloxyethylsulfonyl)phenyl,
2-hydroxy-5-(62 -sulfatoethylsulfonyl)phenyl,
2-methoxy-5-[β-(N-methyltauryl)ethylsulfonyl]phenyl,
5-(β-sulfatoethylsulfonyl)naphth-2-yl,
6-(β-sulfatoethylsulfonyl)naphth-2-yl,
7-(β-sulfatoethylsulfonyl)naphth-2-yl,
8-(β-sulfatoethylsulfonyl)naphth-2-yl,
6-(β-sulfatoethylsulfonyl)-1-sulfonaphth-2-yl,
5-(β-sulfatoethylsulfonyl)-1-sulfonaphth-2-yl,
8-(β-sulfatoethylsulfonyl)-6-sulfonaphth-2-yl,
2-bromo-3-(β-sulfatoethylsulfonyl)phenyl and
2-bromo-4-(β-sulfatoethylsulfonyl)phenyl, of which
preferably 4-(β-sulfatoethylsulfonyl)phenyl and
6-(β-sulfatoethylsulfonyl)-1-sulfonaphth-2-yl.

Preferably, the radical —K—NH— is a radical of the formula (4a), (4b) or (4c)

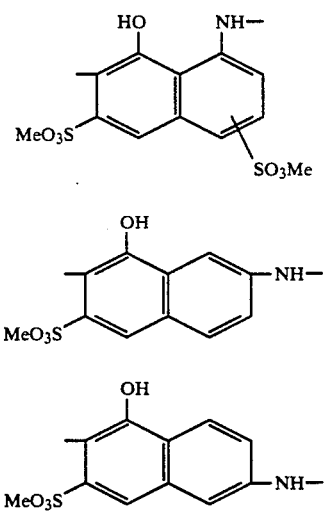

where Me has the abovementioned meaning and in the formula (4a) the —SO₃Me group is either meta or para to the amino group. Particularly preferably, the radical —NH—K— is a radical of the formula (4a), where again the —SO₃Me group is preferably meta to the amino group.

The present invention further relates to a process for preparing the monoazo compounds of the formula (1), which comprises coupling a compound of the formula (5)

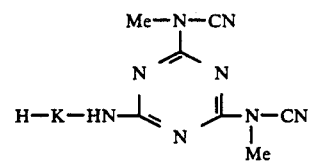

where K and Me are each as defined above, with a diazonium compound of an aromatic amine of the formula D—NH₂, where D is as defined above, in equivalent amounts.

The diazotization of the amine D—NH₂ is effected in a conventional manner, for example in an aqueous medium by means of nitrous acid (for example by means of sodium nitrite in an aqueous solution of a mineral acid, such as hydrochloric acid or sulfuric acid) at a temperature between −5° C. and +15° C. and at a pH below 2. According to the present invention, the coupling reaction is carried out in an aqueous medium at a temperature of between 5° and 40° C., preferably between 10° and 25° C., and at a pH of between 3.5 and 7.5, preferably between 4 and 6.

The synthesis of the starting compounds of the formula (5) is effected by first reacting a trihalo-s-triazine, such as cyanuric fluoride or in particular cyanuric chloride, with two equivalents of cyanamide or of an alkali metal salt of cyanamide at a pH between 5 and 10, preferably between 7 and 9, and at a temperature of initially between −10° C. and +20° C., preferably between −5° C. and +5° C., with a gradual increase to 80° C., preferably 60° C., for instance to a temperature range between 40° C. and 80° C., preferably 40° and 60° C. The third condensation reaction with the component H—K—NH₂ is effected at a pH of between 2 and 7, preferably between 3 and 5, and at a temperature between 40° and 95° C., preferably between 70° and 90° C.

The starting compounds of the formula (5) can also be prepared by first reacting 1 equivalent of cyanamide or of an alkali metal salt thereof with a trihalo-s-triazine, such as cyanuric fluoride or in particular cyanuric chloride, at a temperature between −10° C. and +25° C., preferably between −5° C. and +5° C., and at a pH of between 5 and 10, preferably between 7 and 9, and effecting the subsequent second condensation reaction with 1 equivalent of a compound of the formula H—K—NH₂, where K is as defined above, at a pH between 2 and 8, preferably between 2 and 5, and at a temperature between 0° and 40° C., preferably between 10° and 20° C. The subsequent third condensation reaction of the secondary condensation product with a further equivalent of cyanamide or an alkali metal salt of cyanamide takes place at a pH of between 3 and 9 and at a temperature between 50° and 100° C.

The azo compounds of the formula (1) of the present invention can be converted in respect of their fiber-reactive radicals Y—SO₂— into compounds of otherwise the same structure but with a grouping where Y is another group by known methods, for example starting from the compounds having a β-sulfatoethylsulfonyl or β-chloroethylsulfonyl group into those in which Y is vinyl, and starting from compounds having the β-chloroethylsulfonyl or vinylsulfonyl group into those where Y is β-thiosulfatoethyl. For instance, the vinylsulfonyl compounds are preparable from their corresponding β-chloroethylsulfonyl compounds or their compounds where Y is an ethyl group which contains in the β-position an ester group of an organic or inorganic acid as substituent, for example sulfato or acetyloxy, by the action on these compounds of an alkali in aqueous medium at a pH between 10 and 12 and at a temperature of between 20° and 50° C. and, depending on the temperature, for from 10 minutes to 3 hours, for example at a temperature of 50° C. for from 10 to 20 minutes or at a temperature of 25° C. for from two to three hours; starting from the β-chloroethylsulfonyl or the vinylsulfonyl compound it is possible to prepare the corresponding β-thiosulfatoethylsulfonyl compound at a pH between 4 and 9 and at a temperature between 20° and 60° C. by reaction with sodium thiosulfate.

The separation and isolation of the azo compounds of the formula (1) prepared according to the present invention from the synthesis solutions can be effected by a generally known method, for example either by precipitating from the reaction medium by means of electrolytes, such as sodium chloride or potassium chloride, or by evaporating the reaction solution, for example by spray drying, with or without a buffer substance having been added to the synthesis solution.

The azo compounds of the formula (1) according to the present invention—hereinafter compounds (1)—have fiber-reactive properties and possess very good dye properties. They can therefore be used for dyeing (including printing) hydroxyl- and/or carboxamido-containing fiber materials. Moreover, the solutions obtained in the synthesis of the compounds (1) can be used directly in dyeing as a liquid preparation with or without the addition of a buffer substance and with or without prior concentrating.

The present invention therefore also provides for the use of the novel compounds (1) for dyeing (including printing) hydroxyl- and/or carboxamido-containing fiber materials or rather processes for the application thereof to these substrates. Methods similar to known methods can be employed.

Hydroxyl-containing materials are those of natural or synthetic origin, for example cellulose fiber materials or their regenerated products and polyvinyl alcohols. Cellulose fiber materials are preferably cotton but also other vegetable fibers, such as linen, hemp, jute and ramie fibers; regenerated cellulose fibers are for example staple viscose and filament viscose.

Carboxamido-containing materials are for example synthetic and natural polyamides and polyurethanes in the form of fibers, for example wool and other animal hairs, silk, leather, nylon-6.6, nylon-6, nylon-11 and nylon-4.

The compounds (1) can be applied, as provided for by the use according to the present invention, to the substrates mentioned and fixed thereon by the known application processes for water-soluble dyes, in particular fiberreactive dyes, for example by applying the compound (1) to the substrate in dissolved form or introducing it therein and fixing it thereon or therein with or without heating and/or with or without the action of an alkaline agent. Such dyeing and fixing techniques have been numerously described not only in the technical literature but also in the patent literature, for example in European Patent Application Publication No. 0 181 585A. Owing to their ready solubility in water, they are also particularly suitable for the cold pad-batch process.

The compounds (1) produce not only on carboxamido-containing materials, in particular on wool, but also on hydroxyl-containing materials, in particular cellulose fiber material, yellow to bluish red dyeings and prints having good fastness properties, such as good pleating, hot press and crock fastness properties and in particular a good light fastness and good wet fastness properties, of which in particular the chlorinated water and perspiration fastness properties may be singled out. Furthermore, the compounds (1) are suitable for use in ground dyeings, since dyeings obtainable with the compounds (1) are dischargeable under alkaline and/or reductive conditions and thus can be systematically decolored. Similarly, the compounds (1) are suitable for use in ground dyeings with a subsequent alkaline colored discharge, for example using vat dyes.

The Examples which follow serve to illustrate the invention. Parts and percentages are by weight, unless otherwise stated. Parts by weight bear the same relation to parts by volume as the kilograin to the liter.

The compounds described in these Examples with a formula are indicated in the form of the free acids; in general, they are prepared and isolated in the form of their sodium or potassium salts and used for dyeing in the form of their salts. Similarly, the starting compounds and components mentioned in the form of the free acid in the subsequent Examples, in particular table examples, can be used in the synthesis as such or in the form of their salts, preferably alkali metal salts, such as sodium or potassium salts. The absorption maxima ($\lambda_{max}$ values) indicated for the visible region were determined on aqueous solutions of the alkali metal salts.

Example 1 a) 37.0 parts of cyanuric chloride are suspended in 300 parts of water at 0° C. in the presence of a commercial dispersant, 16.8 parts of cyanamide are added, and the reaction is carried out initially at a temperature between 0° and 5° C. and at a pH maintained between 8.0 and 8.5 by means of aqueous 2N sodium hydroxide solution for about an hour and then at a pH between 7.0 and 8.0 while the reaction temperature is raised to 60° C. The end of the reaction can be monitored by thin layer chromatography. Then 60.6 parts of 1-amino-8-naphthol-3,6-disulfonic acid are added to the reaction batch, the temperature is raised to 80°–85° C. and the third condensation reaction is carried out at a pH between 4 and 4.5. After the reaction batch has been cooled down to 20° C. the compound 1-(2',4°-dicyanamido-1'3',5'-triazin-6'-yl)amino-8-naphthol-3,6-disulfonic acid precipitates and can be isolated by filtration. Advantageously, however, this compound is used directly in the subsequent reaction in the form of the as-synthesized reaction batch.

b) A conventionally prepared aqueous suspension of diazonium salt of 50.0 parts of 4-(β-sulfatoethylsulfonyl)aniline, acidified with hydrochloric acid, is gradually added to the synthesis solution obtained in a), and during the coupling reaction a pH between 4.0 and 4.5 and a temperature of initially 10° C. are maintained and finally the coupling reaction is completed at 25° C. Thereafter the reaction solution is clarified and the monoazo compound of the present invention is precipitated with sodium chloride and isolated.

The monoazo compound of the present invention is obtained in the form of the alkali metal salt (sodium salt). In the form of the free acid it has the formula

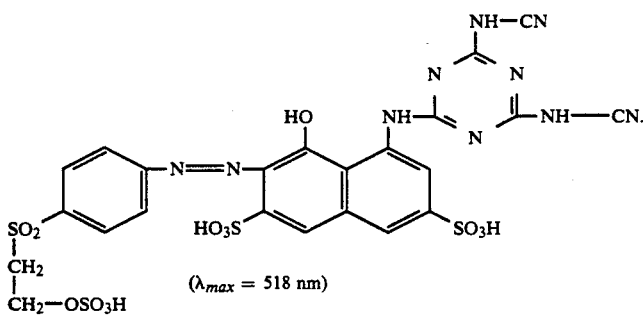

($\lambda_{max}$ = 518 nm)

The monoazo compound of the present invention has very good fiber-reactive dye properties and, applied to the materials mentioned in the description, in particular cellulose fiber materials, by the application and fixing methods customary in the art for fiber-reactive dyes produces strong bright red dyeings having good fastness properties, of which in particular the wet light fastness can be singled out. The monoazo compound of the present invention, furthermore, is suitable for preparing ground dyeings, since it can be subsequently discharged from the fiber.

Example 2

To prepare a monoazo compound of the present invention, the procedure described in Example 1 is followed, except that the diazonium salt of 4-($\beta$-sulfatoethylsulfonyl)-aniline is replaced by the conventionally prepared aqueous suspension of the diazonium salt of 76 parts of 6-($\beta$-sulfatoethylsulfonyl)-1-sulfo-2-naphthylamine, acidified with hydrochloric acid.

The novel alkali metal monoazo compound isolated in the form of an electrolyte(sodium chloride)-containing powder has the formula (written in the form of the free acids)

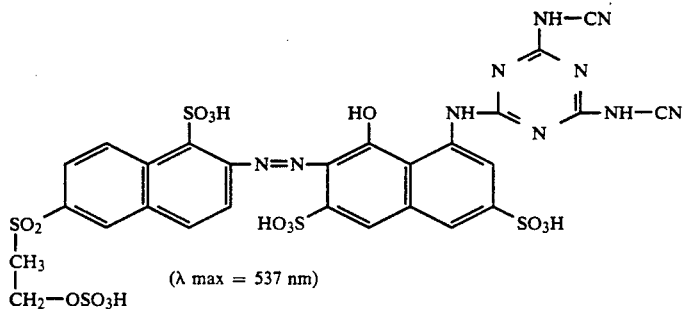

($\lambda$ max = 537 nm)

and very good fiber-reactive dye properties and, applied by the application methods known in the art, produces strong bright red dyeings and prints having good fastness properties, of which in particular the chlorine fastness can be singled out.

Example 3

To prepare a monoazo compound of the present invention, the procedure described in Example 1 is followed, except that the 1-amino-8-naphthol-3,6-disulfonic acid is replaced as one of the starting compounds by the same amount of 1-amino-8-naphthol-4,6-disulfonic acid.

The monoazo compound of the present invention has written in the form of free acid the formula

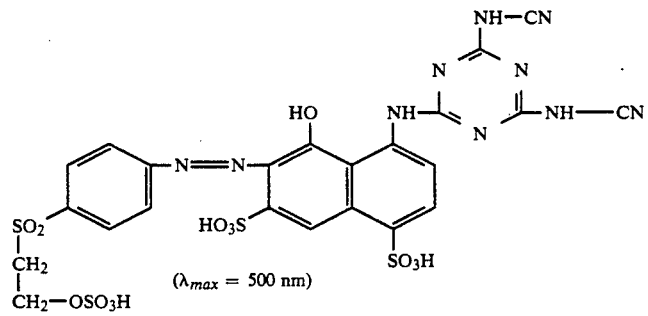

($\lambda_{max}$ = 500 nm)

and very good fiber-reactive dye properties and, applied by the application methods customary for fiber-reactive dyes, produces in particular on cellulose materials strong fast red dyeings and prints having good fastness properties.

Example 4

184 parts of cyanuric chloride are suspended in a mixture of 500 parts of ice and water in the presence of a commercial dispersant, and 84 parts of cyanamide are added. The first condensation reaction is carried out at a pH between 7.5 and 8.0, the end of the reaction being verifiable by thin layer chromatography. To carry out the second condensation reaction the temperature is gradually raised to 75° C. and the mixture is kept at that temperature until the condensation reaction has ended. Then 205 parts of 2-amino-8-naphthol-6-sulfonic acid are added, the pH is adjusted to a value between 4 and 4.5 and the third condensation reaction is completed within this pH range at from 80° to 85° C., the reaction again being monitorable by thin layer chromatography.

The synthesis solution obtained on completion of the condensation reactions is clarified in a conventional manner and cooled down to 15°–20° C. A conventionally prepared aqueous suspension of the diazonium salt of 235 parts of 4-(β-sulfatoethylsulfonyl)aniline, acidified with hydrochloric acid, is added and the coupling reaction is carried out at a pH of 4.5. Then the batch is clarified, for example by means of kieselguhr and subsequent filtration, and the monoazo compound of the present invention is precipitated by means of sodium chloride and isolated; however, it may also be isolated by evaporating the clarified synthesis solution to dryness or by spraydrying the synthesis solution.

The novel monoazo compound of the formula

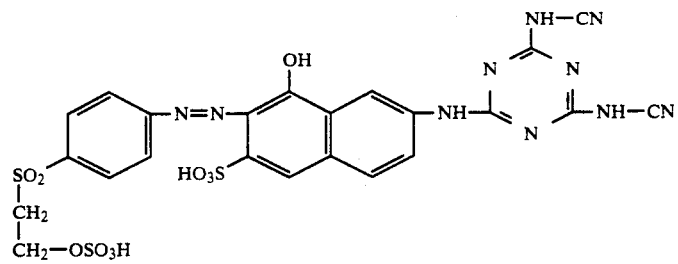

is obtained in the form of the alkali metal salt (sodium salt). It likewise has fiber-reactive dye properties and, applied to the materials mentioned in the description, in particular cellulose fiber materials, such as cotton, by the conventional application methods, produces fast strong reddish brown shades.

Example 5

To prepare a monoazo compound of the present invention, the procedure of Example 4 is followed, except that the 2-amino-8-naphthol-6-sulfonic acid is replaced as one of the starting compounds by the same amount of 3-amino-8-naphthol-6-sulfonic acid. The monoazo compound obtained has an absorption maximum at 490 nm, shows very good fiber-reactive dye properties and, applied by the application methods customary for fiber reactive dyes, produces in particular on cellulose fiber materials strong fast dyeings and prints in orange shades.

Examples 6 to 19

The table examples below describe further novel monoazo compounds in terms of formula (A)

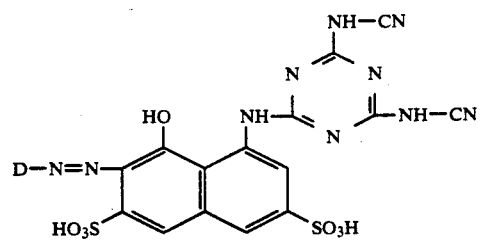

They can be prepared in the manner of the present invention from the starting components evident from the particular table example in conjunction with the formula (A), for example in a manner similar to the above Examples 1 to 5. They have very good fiber reactive dye properties and, applied to the materials mentioned in the description, in particular cellulose fiber materials, by the known application and fixing methods, dye these materials in strong, fast shades indicated for the particular table example.

Monoazo compound (A)

| Example | with radical D | Hue |
| --- | --- | --- |
| 6 | 3-(β-sulfatoethylsulfonyl)phenyl | red (510) |
| 7 | 2-carboxy-5-(β-sulfatoethylsulfonyl)phenyl | red |
| 8 | 2-ethoxy-5-(β-sulfatoethylsulfonyl)phenyl | bluish red |
| 9 | 2-methoxy-5-(β-sulfatoethylsulfonyl)phenyl | bluish red |
| 10 | 4-vinylsulfonylphenyl | red |
| 11 | 2,5-dimethoxy-4-(β-sulfatoethylsulfonyl)phenyl | violet |
| 12 | 5-methyl-2-methoxy-4-(β-sulfatoethylsulfonyl)phenyl | reddish violet |
| 13 | 2,5-dimethyl-4-(β-sulfatoethylsulfonyl)phenyl | reddish violet |
| 14 | 2-sulfo-4-(β-sulfatoethylsulfonyl)phenyl | red |
| 15 | 4-[N-(3'-β-sulfatoethylsulfonyl)phenyl]-amidocarbonylphenyl | red |
| 16 | 2-sulfo-5-(β-sulfatoethylsulfonyl)phenyl | red |
| 17 | 6-(β-sulfatoethylethylsulfonyl)-naphth-2-yl | violet |
| 18 | 8-(β-sulfatoethylsulfonyl)-6-sulfonaphth-2-yl | bluish red |
| 19 | 5-(β-sulfatoethylsulfonyl)-naphth-1-yl | bluish red |

Examples 20 to 32

The table examples below describe further novel monoazo compounds in terms of formula (B)

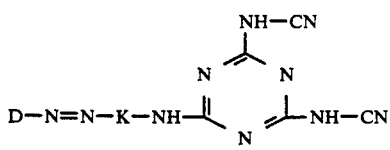

They can be prepared in the manner of the present invention from the starting components evident from the particular table example in conjunction with the formula (B), for example in a manner similar to the above embodiment Examples. They have very good fiber reactive dye properties and, applied to the materials mentioned in the description, in particular cellulose fiber materials, by the known application and fixing methods, dye these materials in strong, fast shades indicated for the particular table example.

| Example | Monoazo compound of the formula (B) with Radical D | Component H-K-NH$_2$ | Hue |
|---|---|---|---|
| 20 | 4-vinylsulfonyl-phenyl | 1-amino-4,6-disulfo-8-naphthol | red |
| 21 | 3-(β-sulfatoethyl-sulfonyl)phenyl | 1-amino-4,6-disulfo-8-naphthol | red |
| 22 | 1-sulfo-6-(β-sulfato-ethylsulfonyl)naphth-2-yl | 1-amino-4,6-disulfo-8-naphthol | reddish violet |
| 23 | 2-methoxy-5-(β-sul-fatoethylsulfonyl)-phenyl | 1-amino-4,6-disulfo-8-naphthol | bluish red |
| 24 | 2-sulfo-5-(β-sulfato-ethylsulfonyl)phenyl | 1-amino-4,6-disulfo-8-naphthol | red |
| 25 | 3-(β-sulfatoethyl-sulfonyl)phenyl | 2-amino-6-sulfo-8-naphthol | orange |
| 26 | 2-methoxy-5-(β-sulfatoethyl-sulfonyl)phenyl | 2-amino-6-sulfo-8-naphthol | reddish brown |
| 27 | 6-sulfo-8-(β-sulfatoethyl-sulfonyl)napth-2-yl | 2-amino-6-sulfo-8-naphthol | orange |
| 28 | 1-sulfo-6-(β-sulfatoethyl-sulfonyl)naphth-2-yl | 2-amino-6-sulfo-8-naphthol | orange (500) |
| 29 | 4-(β-thiosulfato-ethylsulfonyl)phenyl | 3-amino-6-sulfo-8-naphthol | orange (490) |
| 30 | 3-(β-sulfatoethyl-sulfonyl)phenyl | 3-amino-6-sulfo-8-naphthol | orange (473) |
| 31 | 6-sulfo-8-(β-sulfatoethyl-sulfonyl)naphth-2-yl) | 3-amino-6-sulfo-8-naphthol | orange |
| 32 | 2-methoxy-5-(β-sulfatoethyl-sulfonyl)phenyl | 3-amino-6-sulfo-8-naphthol | reddish orange |

What is claimed is:

1. A monoazo compound conforming to the formula (b 1)

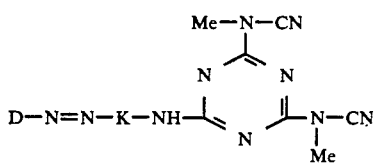

where
Me is hydrogen or an alkali metal;
K is a radical of the formula (2)

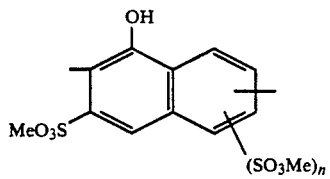

where
Me has one of the abovementioned meanings and
n is zero or 1 (if zero, this group being hydrogen);
D is a group of the formula (3a), 3b) or (3c)

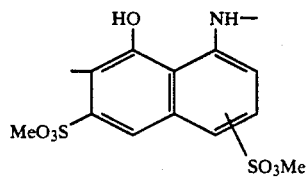

where
Me has one of the abovementioned meanings,
R$^1$ is hydrogen, alkyl of from 1 to 4 carbon atoms, which may be sulfo-, carboxyl- or sulfato-substituted, alkoxy of from 1 to 4 carbon atoms, which may be sulfo-, carboxyl-, or sulfato-substituted, chlorine, bromine, hydroxyl, cyano, carboxyl or sulfo,
R$^2$ is hydrogen, alkyl of from 1 to 4 carbon atoms or alkoxy of from 1 to 4 carbon atoms,
Y is vinyl or ethyl which contains in the β-position a substituent which is eliminable by alkali to form a vinyl group, and
m is zero, 1 to 2 (if zero, this group being hydrogen).

2. A monoazo compound as claimed in claim 1, wherein n is 1.

3. A monoazo compound as claimed in claim 1 wherein the radical —K—NH— is a radical of the formula (4a)

where Me is as defined in claim 1.

4. A monoazo compound as claimed in claim 3, wherein in the formula (4a) the —SO$_3$Me group is bonded meta to the —NH— group.

5. A monoazo compound as claimed in claim 1, wherein D is 4-($\beta$-sulfatoethylsulfonyl)phenyl.

6. A monoazo compound as claimed in claim 1, wherein D is 1-sulfo-6-($\beta$-sulfatoethylsulfonyl)naphth-2-yl.

7. A monoazo compound as claimed in claim 1, wherein Y is vinyl, $\beta$-thiosulfatoethyl, $\beta$-chloroethylsulfonyl or $\beta$-sulfatoethyl.

8. A monoazo compound as claimed in claim 7, wherein Y is $\beta$-sulfatoethyl.

9. A process for dyeing and printing hydroxyl- and-/or carboxamido-containing material, in which a dye is applied to or introduced into the material and fixed thereon or therein by means of heat or with the aid of an alkaline agent or by means of heat and with the aid of an alkaline agent, which comprises using as the dye a monoazo compound of the formula (1) of claim 1.

10. A process for dyeing and printing as claimed in claim 9, wherein said material is a fiber material.

UNITED STATES PATENT AND TRADEMARK OFFICE
CERTIFICATE OF CORRECTION

PATENT NO. : 5,290,923

DATED : March 1, 1994

INVENTOR(S) : Springer et al

It is certified that error appears in the above-indentified patent and that said Letters Patent is hereby corrected as shown below:

In the Abstract, formula (1) should read:

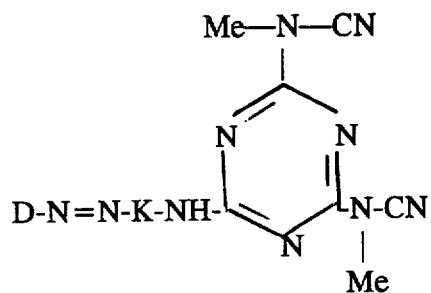

At column 1, line 30, formula (1) should read:

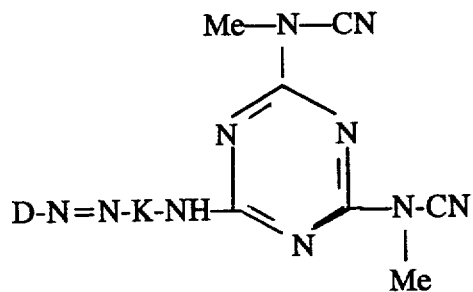

UNITED STATES PATENT AND TRADEMARK OFFICE
CERTIFICATE OF CORRECTION

PATENT NO. : 5,290,923
DATED : March 1, 1994
INVENTOR(S) : Springer et al

It is certified that error appears in the above-indentified patent and that said Letters Patent is hereby corrected as shown below:

At column 3, line 1, "2,4-dimethoxy-5-(ß-sulfatoethylsulfonyl)phenyl" should read --2,4-diethoxy-5-(ß-sulfatoethylsulfonyl)phenyl--.

At column 3, line 18, "2-hydroxy-5-(62-sulfatoethylsulfonyl)phenyl" should read --2-hydroxy-5-(ß-sulfatoethylsulfonyl)phenyl--.

At column 6, line 19, "kilograin" should read --kilogram--.

At column 6, line 49, "1-(2',4°-dicyanamido" should read --1-(2',4'-dicyanamido--.

At column 7, line 1, the right portion of the compound formula should read

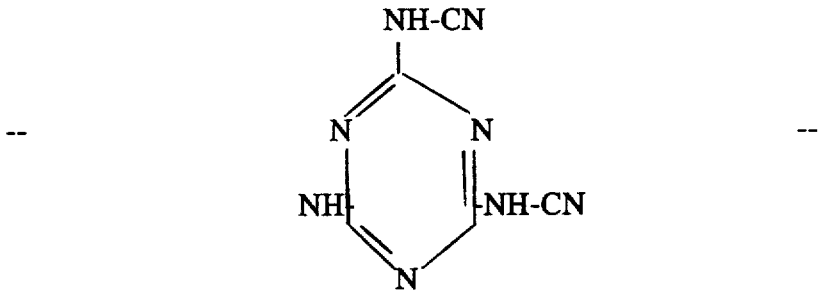

UNITED STATES PATENT AND TRADEMARK OFFICE
CERTIFICATE OF CORRECTION

PATENT NO. : 5,290,923

DATED : March 1, 1994

INVENTOR(S) : Springer et al

It is certified that error appears in the above-indentified patent and that said Letters Patent is hereby corrected as shown below:

At column 7, line 53, the left portion of the compound formula should read

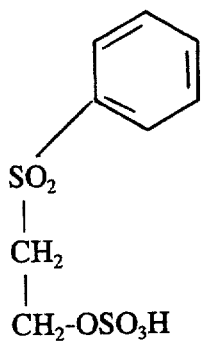

At column 11, line 5, the formula (B) should read:

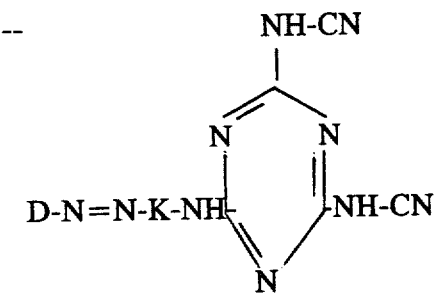

UNITED STATES PATENT AND TRADEMARK OFFICE
CERTIFICATE OF CORRECTION

PATENT NO. : 5,290,923
DATED : March 1, 1994
INVENTOR(S) : Springer et al

It is certified that error appears in the above-indentified patent and that said Letters Patent is hereby corrected as shown below:

In claim 1, at column 11, line 56 "(b1)" should read --(1)--.

In claim 1, at column 11, line 60, formula (1) should read:

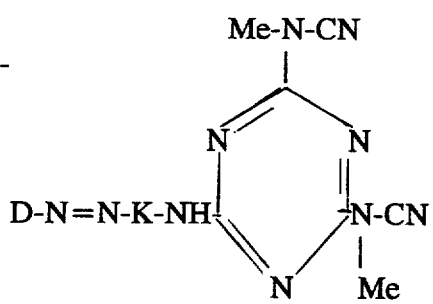

In claim 7, at column 13, lines 7-8, "ß-chloroethylsulfonyl" should read --ß-chloroethyl-.

Signed and Sealed this

Thirtieth Day of May, 1995

Attest:

BRUCE LEHMAN

Attesting Officer    Commissioner of Patents and Trademarks